US011067715B2

(12) United States Patent
Wahrlich

(10) Patent No.: US 11,067,715 B2
(45) Date of Patent: Jul. 20, 2021

(54) SIGNAL PROCESSING TECHNIQUE FOR A METAL DETECTOR

(71) Applicant: Minelab Electronics Pty Limited, Mawson Lakes (AU)

(72) Inventor: Philip Shane Wahrlich, Mawson Lakes (AU)

(73) Assignee: Minelab Electronics Pty. Limited, South Australia (AU)

( * ) Notice: Subject to any disclaimer, the term of this patent is extended or adjusted under 35 U.S.C. 154(b) by 58 days.

(21) Appl. No.: 16/273,415

(22) Filed: Feb. 12, 2019

(65) Prior Publication Data
US 2019/0250301 A1 Aug. 15, 2019

(30) Foreign Application Priority Data
Feb. 12, 2018 (AU) .................... 2018900430

(51) Int. Cl.
*G01V 3/38* (2006.01)
*G01V 3/10* (2006.01)
*G01V 3/14* (2006.01)

(52) U.S. Cl.
CPC ............ *G01V 3/38* (2013.01); *G01V 3/10* (2013.01); *G01V 3/14* (2013.01)

(58) Field of Classification Search
CPC ............. G01V 3/15; G01V 3/16; G01V 3/165
See application file for complete search history.

(56) References Cited

U.S. PATENT DOCUMENTS

| | | | | |
|---|---|---|---|---|
| 4,866,424 A | * | 9/1989 | Parks .................. | G01T 1/167 340/551 |
| 9,429,674 B2 | | 8/2016 | Wahrlich | |
| 10,078,148 B2 | | 9/2018 | Candy | |
| 2008/0054905 A1 | * | 3/2008 | Linse .................. | G01V 3/101 324/326 |
| 2018/0172869 A1 | * | 6/2018 | Candy .................. | G01V 3/38 |

FOREIGN PATENT DOCUMENTS

| | | |
|---|---|---|
| AU | 2009901586 | 4/2009 |
| AU | 2014218370 B2 | 2/2015 |
| AU | 2014268189 B2 | 6/2016 |

* cited by examiner

*Primary Examiner* — Tung X Nguyen
(74) *Attorney, Agent, or Firm* — The Webb Law Firm

(57) ABSTRACT

A method for improving a metal detector, including: processing at least one receive signal due to a receive magnetic field using at least two functions to produce two processed signals, the at least two functions are selected such that the first processed signal is more sensitive to deeply buried targets than the second processed signal; and the second processed signal is more sensitive to shallow-buried conductive objects with characteristic frequency greater than 100 kHz than the first processed signal but not sensitive to saline soil, and that the two processed signals substantially complement each other in terms of sensitivity to targets in terms of target frequency and detection depth; and processing the two processed signals to produce at least one output signal which is sensitive to deeply buried low-frequency targets, shallow-buried low-frequency targets and shallow-buried high-frequency targets while signals due to saline soil are substantially rejected from the output signal.

17 Claims, 6 Drawing Sheets

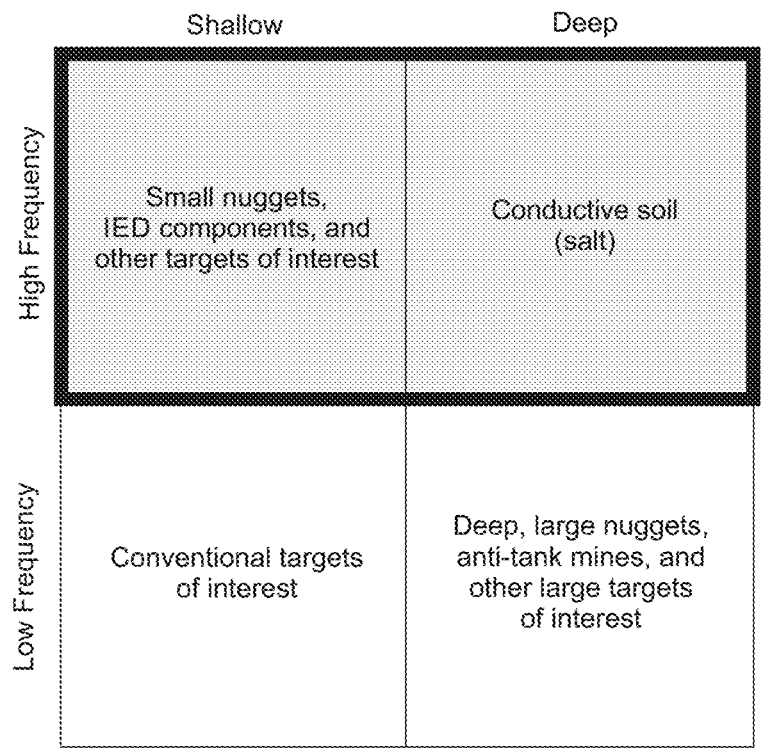

Figure 3 processing at least one receive signal due to a receive magnetic field using at least two functions to produce two processed signals, the at least two functions are selected such that the first processed signal is more sensitive to deeply buried targets than the second processed signal; and the second processed signal is more sensitive to shallow-buried conductive objects with characteristic frequency greater than 100kHz than the first processed signal but not sensitive to saline soil, and that the two processed signals substantially complement each other in terms of sensitivity to targets in terms of target frequency and detection depth processing the two process signals to provide information which is sensitive to deeply buried low-frequency targets, shallow-burried low-frequency targets and shallow-burried high-frequency targets while not being sensitive to saline soil.

Figure 4

SIGNAL PROCESSING TECHNIQUE FOR A METAL DETECTOR

CROSS-REFERENCE TO RELATED APPLICATION

This application claims priority to Australian Patent Application No. 2018900430 filed Feb. 12, 2018, the disclosure of which is hereby incorporated by reference in its entirety.

TECHNICAL FIELD

The present invention relates to a signal processing technique for a metal detector.

BACKGROUND

The general forms of most metal detectors which interrogate soil are either handheld battery operated units, conveyor-mounted units, or vehicle-mounted units. Examples of handheld products include detectors used to locate gold, explosive land mines or ordnance, coins and treasure. Examples of conveyor-mounted units include fine gold detectors in ore mining operations, and examples of a vehicle-mounted unit include a unit to locate buried land mines.

These metal detectors usually, but not necessarily, consist of transmit electronics generating a repeating transmit signal cycle of a fundamental period, which is applied to an inductor, for example a transmit coil, which transmits a resulting varying magnetic field, sometimes referred to as a transmit magnetic field.

These metal detectors may also contain receive electronics that processes a receive signal from a measured receive magnetic field, during one or more receive periods during the repeating transmit signal cycle, to produce an indicator output signal, the indicator output signal at least indicating the presence of at least a metal target within the influence of the transmit magnetic field.

During the processing of the receive signal, the receive signal is either sampled, or demodulated, to produce one or more target channels, the one or more target channels may be further processed to produce the indicator output signal.

Time-domain metal detectors typically include pulse-induction ("PI") or pulse-induction like metal detectors, and rectangular pulse metal detectors, wherein the receive processing includes either sampling of the receive signal or demodulation over selected periods, which may include gain weighting.

Frequency domain metal detectors typically include single- or multi-frequency transmission, or pulse transmission with one or more demodulation functions, which may be sinusoidal demodulation functions, and which contain frequency components corresponding to those transmitted.

Targets can be generally classified into four categories: Referring to FIG. 1, the categories are high-frequency targets in the shallow-buried region (top left corner), high-frequency targets in the deep-buried region (top right corner), low-frequency targets in the shallow-buried region (bottom left corner) and low-frequency targets in the deep-buried region (bottom right corner). In the context of high-frequency targets and low-frequency targets, the frequency refers to the characteristic or relaxation frequency of eddy currents generated in the target. Eddy currents are loops of electrical current induced within a target when the target is within the influence of a time-varying magnetic field, such as the time-varying magnetic field generated by a metal detector via a transmitter or a transmit coil. A characteristic frequency relates to the time constant of eddy current which quantifies the timescale over which the eddy current diminishes. Generally, a small object (such as a small gold nugget) would have a higher characteristic frequency than that of a large object (such as a large gold bullion). These frequencies, or characteristic frequencies, are different from the transmission frequency of a metal detector.

A target refers a desirable object of interest. Depending on the application of a metal detector, a target for a prospector can be nuggets of precious metal (e.g. gold); for military personnel a target can be a land mine or improvised explosive device (IED); for a hobbyist a target can be a coin or an item of jewelry.

Shallow-buried and deep-buried are relative terms. In metal detection, whether a target is referred to as being shallow-buried or deep-buried depends on the size of transmit and/or receive coils. While there is no authoritative definition for these two terms, for a hand-held metal detector with coil diameters of about 30 cm, it is common to consider a depth from a surface of less than approximately 30 cm to be shallow and any depth of at least 30 cm is considered to be deep.

For conductive objects far from the search coil, the signal in the receive coil decreases with roughly the sixth power of the distance between the search coil and the object. This means that deep objects found with a metal detector are typically large objects that have a strong magnetic coupling to the search coil for a given distance. These large objects tend to have low characteristic frequencies, which result from large eddy current loops produced in their large conductive volumes. On the other hand, those targets that have high relaxation frequencies are generally small, and couple only weakly to the search coil at a given distance. This limits the signal produced by high frequency targets, and therefore also the depth at which they can be reliably detected. Accordingly, high-frequency targets are expected to be detected in the shallow-buried region, but not in deep-buried region. Low-frequency targets are expected to be found in both the shallow region and the deep region.

The conductive component of ground, such as that found in alkali soil and beach sand near saltwater, which is usually modelled as a uniform conducting half-space, can in many circumstances produce a response similar to a deep-buried target with a high relaxation frequency, and is a source of noise in metal detectors.

Metal detectors capable of detecting high-frequency targets in the deep-buried region are also prone to detecting the conductive component of ground. The metal detector design can be modified to reduce the signal from the conductive component of the ground, however this typically involves modifications that also reduce the signal from deep-buried low-frequency targets of interest.

One way of avoiding the detection of the conductive component of the ground is to use so-called anti-interference coils, which use quadrupole receive and/or transmit coils. These coils reduce ability of the metal detector to detect all deep targets by reducing the magnetic coupling between the transmit and receive coils via conductive targets when the distance between the quadrupole coil and the conductive target is large. As shown in FIG. 2, the shaded targets (top right and bottom right) are substantially rejected. This is non-ideal as, along with the substantial rejection of the unwanted response from conductive component of ground, desired deep low-frequency targets are substantially rejected as well.

Another way of avoiding the detection of the conductive component of the ground is to implement a high-pass filter, which attenuates signals which vary slowly in time. When the search coil is swung over the surface of the ground, the signal produced by a deep-buried target tends to be broader in time compared to the signal produced by a shallow-buried target. The application of a high-pass filter to this signal will therefore act to attenuate the signal from deep-buried targets more than it attenuates the signal from shallow-buried targets. The end results are similar to that of FIG. 2, in that despite the substantial rejection of the unwanted response from the conductive component of ground, desired deep low-frequency targets are also substantially rejected.

Yet another way is to process the receive signal to respond differently to targets of different frequencies. This can be using specific demodulation functions which are insensitive to different target frequencies, combining different channels generated from demodulation functions which have different sensitivities to different target frequencies, subtracting models in order to produce a residual signal which is insensitive to different target frequencies, or identifying using at least two channels which response differently to targets of different frequencies to identify the presence of a high-frequency target and suppress the detector response when this is the case. In a conventional metal detector, the identification of the presence of a high-frequency target is commonly referred as "discrimination". An example of discrimination is to measure the target phase angle relative to the phase angle of the transmit magnetic field in a single-frequency metal detector, and to suppress the audio response when the target phase angle is close to 90 degrees relative to the phase angle of the transmit magnetic field. When these techniques are employed to reduce the response of high-frequency targets, the response from conductive ground is also reduced, but the response from shallow-buried high-frequency targets of interest is also reduced, as shown in FIG. 3, where the shaded targets are rejected (top left and top right). This is also non ideal as desired high-frequency targets in shallow region are rejected.

Embodiments described herein rejects high-frequency targets in the deep region, while accepting high-frequency target in the shallow region, low-frequency targets in the shallow region and low-frequency targets in the deep region.

SUMMARY

According to one aspect, there is provided a method for improving a metal detector, including: processing at least one receive signal due to a receive magnetic field using at least two functions to produce two processed signals, the at least two functions are selected such that the first processed signal is more sensitive to deeply buried targets than the second processed signal; and such that the second processed signal is more sensitive to shallow-buried conductive objects with characteristic frequency greater than 100 kHz than the first processed signal but not sensitive to saline soil, and that the two processed signals substantially complement each other in terms of sensitivity to targets in terms of target frequency and detection depth; and processing the two processed signals to provide information which is sensitive to deeply buried low-frequency targets, shallow-buried low-frequency targets and shallow-buried high-frequency targets while not being sensitive to saline soil.

In one form, the information is provided within a signal that is with signals due to saline soil substantially rejected therefrom. In one form, the information is provided within more than one signals, each signal is with signals due to saline soil substantially rejected therefrom, and each signal has one or more characteristics of sensitive to deeply buried low-frequency targets, sensitive to shallow-buried low-frequency targets and sensitive to shallow-buried high-frequency targets.

In one form, the first function is a salt cancelling function. In one form, the second processed signal is based on a receive signal from a quadrupole coil. In one form, the two functions are further selected such that the first processed signal is more sensitive to anomalies which are extended in time than the second processed signal. In one form, the second function includes a high-pass filtering with larger attenuation at 0.5 Hz than high-pass filtering included in the first function.

In one form, the step of producing the two processed signals includes the step of attenuating slowly varying signals. In one form, the step of attenuating slowly varying signals includes an application of a high-pass filter.

In one form, the two processed signals are presented as two indicator signals to a user of the metal detector. In one form, the two processed signals are combined as a single indicator signals to a user of the metal detector. In one form, signals due to saline soil are substantially rejected.

According to another aspect, there is provided a metal detector, including: a transmit coil to transmit a magnetic field; a receive coil to receive a receive magnetic field to generate at least one receive signal; and a processor for: processing the at least one receive signal due to a receive magnetic field using two functions to produce two processed signals, the two functions are selected such that the first processed signal is more sensitive to deeply buried targets than the second processed signal; and such that the second processed signal is more sensitive to conductive objects with characteristic frequency greater than 100 kHz than the first processed signal, and that the two functions substantially complement each other in terms of detection frequency and detection depth; and processing the two processed signals to produce at least one output signal which is with lower sensitivity to deeply buried high-frequency targets than sensitivity to deeply buried low-frequency targets and shallow-buried high-frequency targets.

According to another aspect, there is provided a non-transitory computer readable medium including instructions to perform the steps of processing at least one receive signal due to a receive magnetic field using two functions to produce two processed signals, the two functions are selected such that the first processed signal is more sensitive to deeply buried targets than the second processed signal; and such that the second processed signal is more sensitive to conductive objects with characteristic frequency greater than 100 kHz than the first processed signal, and that the two functions substantially complement each other in terms of detection frequency and detection depth; and processing the two processed signals to produce at least one output signal which is with lower sensitivity to deeply buried high-frequency targets than sensitivity to deeply buried low-frequency targets and shallow-buried high-frequency targets.

BRIEF DESCRIPTION OF DRAWINGS

Embodiments of the present invention will be discussed with reference to the accompanying drawings wherein:

FIG. 3 shows the performance of another prior art with respect to classification of FIG. 1;

FIG. 4 depicts one embodiment to rejects high-frequency target in deep region, while accepting high-frequency target in shallow region, low-frequency target in shallow region and low-frequency target in deep region;

DESCRIPTION OF EMBODIMENTS

Figure 1:
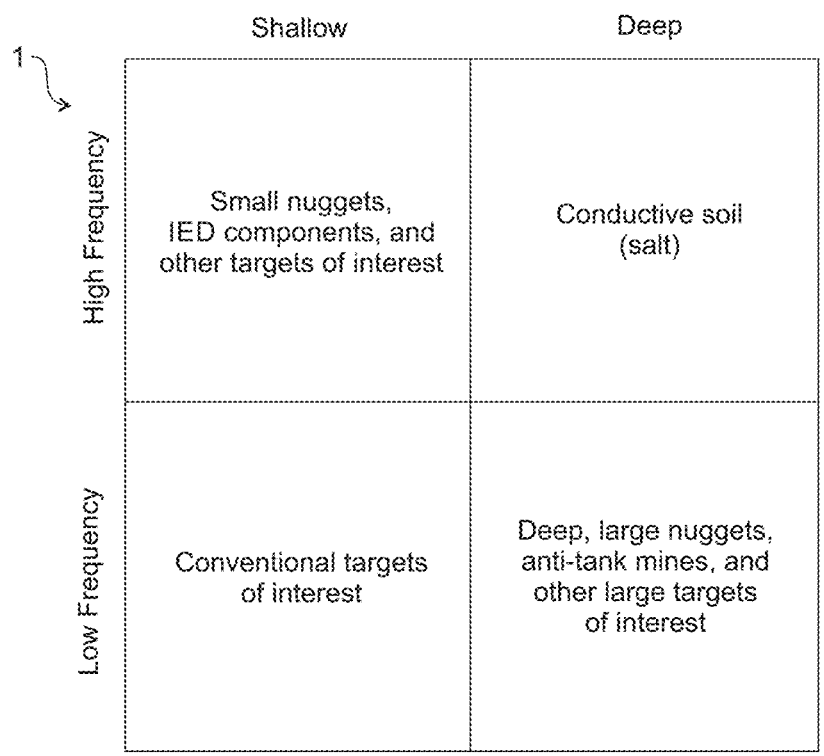
FIG. 1 depicts one way to classify targets and conductive soil.
Figure 2:
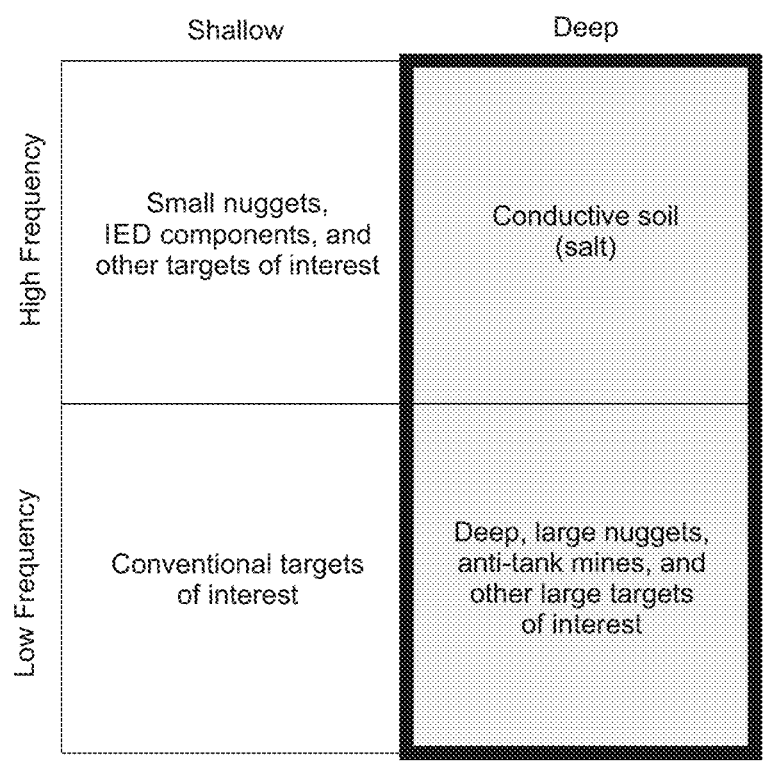
FIG. 2 shows the performance of a prior art with respect to classification of FIG. 1.

In this specification, the term "component" is used to refer to a part of a larger whole. When referring to a signal, a component of a signal means a part of a signal, and a superposition of all components of a signal, forms the signal. For example, a log-uniform component of the soil means part of a signal from the soil which has a log-uniform characteristic.

FIG. 4 depicts one embodiment to rejects high-frequency target in deep region, while accepting high-frequency target in shallow region, low-frequency target in shallow region and low-frequency target in deep region. In this embodiment, the method includes the step 11 of processing at least one receive signal due to a receive magnetic field using at least two functions to produce two processed signals, the at least two functions are selected such that the first processed signal is more sensitive to deeply buried targets than the second processed signal; and the second processed signal is more sensitive to shallow-buried conductive objects with characteristic frequency greater than 100 kHz than the first processed signal but not sensitive to saline soil, and that the two processed signals substantially complement each other in terms of sensitivity to targets in terms of target frequency and detection depth.

Detection frequency is the range of characteristic frequencies of conductive objects which can be detected. In other words, conductive objects with characteristic frequencies outside the detection frequency would not be detected effectively. As a person skilled in the art would understand that there is no hard boundary between which frequencies will be detected and which will not. Outside of the detection frequency range, the signal from target will decrease, but in general, there will still be some small signal remaining; the likelihood of detecting this small signal will be very low.

When referring to "substantially rejected", one may consider that signals due to saline soil are "substantially rejected" when at least 80% of the signals due to saline soil, that would otherwise detected by a metal detector with no ground balancing technique or signal processing technique applied, are suppressed, removed or rejected.

When referring to "sensitive", "sensitive" means able to sense in the context of this specification. When used with reference to a signal, it means the signal contains information in relation to certain target. For example, in a sentence such as "the first processed signal is more sensitive to deeply buried low-frequency targets than the second processed signal", it means the first processed signal carries more information related to the deeply buried low-frequency targets than the second processed signal.

In this specification, "complement" simply means improve. For example, the phrase "the two functions substantially complement each other in terms of detection frequency and detection depth", simply means that the resultant detection frequency and detection depth of the two functions are better than each of the individual detection frequency and detection depth. In other words, at some detection frequency where the processed signal from one function has low detection depth, the other processed signal from the other function has high detection depth, and vice versa. The term "complement" does not necessitate making complete or making prefect. For example, the first function may have a detection depth of 0 to 15 cm; the second function 10 to 30 cm. Note that the range of each function can overlap or there can be no overlap at all, for example, the first function may have a detection depth of 0 to 15 cm; the second function 20 to 30 cm.

The receive signal can be a receive signal from a receiver of a transmitter-receiver pair. It can also be a received signal from an antenna which acts as both the transmitter and receiver. The two functions can be in a form of a function of time, or a complex mathematical function. The functions can be synchronous demodulation functions or based on one or more signal processing techniques, or a combination of any of the above. The two functions need not be in a same form. In one form, one of the two functions is a salt cancelling function. In one form, one of the processed signal is based on a receive signal from a quadrupole coil. In one form, one of the functions includes a high-pass filtering with larger attenuation at 0.5 Hz than high-pass filtering included in the other functions.

In one form, the two functions are further selected such that the first processed signal is more sensitive to signals which are extended in time than the second processed signal.

In one form, the step of producing the two processed signals includes the step of attenuating slowly varying signals. In one form, it is effected by an application of a high-pass filter. The slowly varying signals can be produced when the coil swung over deep targets and saline soil, whereas in contrast shallow-buried targets typical produce a rapidly varying signal.

After step 11, step 13 is performed, which is to process the two processed signals to provide information which is sensitive to deeply buried low-frequency targets, shallow-buried low-frequency targets and shallow-buried high-frequency targets while not being sensitive to signals due to saline soil. In one form, the two processed signals are combined as a single indicator signals to a user of the metal detector. In one form, the two processed signals are presented as two indicator signals to a user of the metal detector.

In one form, the information is provided within a signal that is with signals due to saline soil substantially rejected therefrom. In one form, the information is provided within more than one signal, each signal is signals due to saline soil substantially rejected therefrom, and each signal has one or more characteristics of sensitive to deeply buried low-frequency targets, sensitive to shallow-buried low-frequency targets and sensitive to shallow-buried high-frequency targets. For example, the information can be are contained within a single signal which is sensitive to deeply buried low-frequency targets, shallow-buried low-frequency targets and shallow-buried high-frequency targets while not being sensitive to saline soil. Alternatively, there can be a plurality of signals; together they will provide information which is sensitive to deeply buried low-frequency targets, shallow-buried low-frequency targets and shallow-buried high-frequency targets while not being sensitive to saline soil. For example, there are three signals. While all of them are insensitive to saline coil, each of them exhibits one different characteristic of the following characteristics: sensitive to deeply buried low-frequency targets, sensitive to shallow-buried low-frequency targets and sensitive to shallow-buried high-frequency targets.

In one form, there are two receive signals, a first receive signal and a second receive signal different from the first signal. They are processed using the at least two functions to produce two processed signals. In one form, the first receive signal is from a large receive coil and the second receive signal is from a small receive coil. In one form, the first receive signal is from a dipole receive coil and the second receive signal is from a quadrupole receive coil. In any of the above case, the first receive signal is processed with the salt-cancelling function, so is sensitive to deep targets but insensitive to saline soils in the deep region; the second receive signal is sensitive to high frequency targets (both in the shallow and deep regions) but not sensitive to saline soils. With such arrangement the first receive signal can be used to complement the second receive signal in that the second receive signal is not sensitive to deep-buried low-frequency targets, but the first receive signal is sensitive to deep-buried low-frequency targets.

Figure 5:
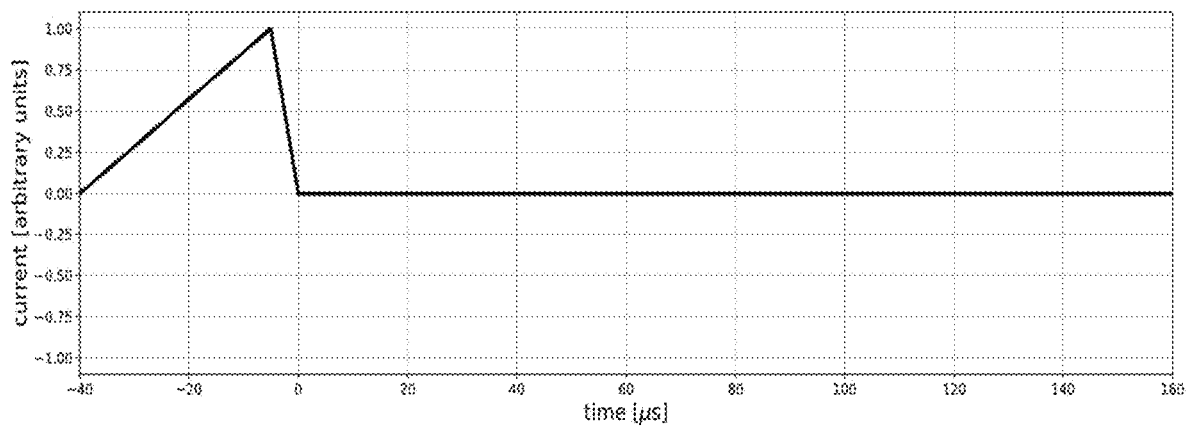
FIG. 5 shows an exemplary transmit signal in one embodiment of this specification.

In one embodiment with reference to a pulse induction metal detector, the transmit waveform has a single pulse per each of the repeating period. FIG. 5 shows an exemplary transmit signal of this form. This transmit magnetic field waveform consists of a period of time T during which the magnetic field ramps linearly from zero to a positive field strength, followed by a period of time p during which the magnetic field decreases rapidly back to zero field strength, followed by a period of time r during which the magnetic field is maintained at zero field strength. The waveform then repeats continuously.

It is well known that the voltage induced in the receive coil from soil which exhibits viscous remanent magnetism due to a magnetic step follows a decay curve which can be modelled as function of time t as $$V(t) \propto \frac{1}{t}$$

The voltage induced in the receive coil from soil which exhibits viscous remanent magnetism due to the transmit magnetic field waveform follows a decay curve during each zero magnetic field period which can be modelled as a function of time t as $$V(t) \propto \frac{1}{T}\sum_{n=0}^{\infty} \ln\left(\frac{t+T+p+n(T+p+r)}{t+p+n(T+p+r)}\right) + \frac{1}{p}\sum_{n=0}^{\infty} \ln\left(\frac{t+n(T+p+r)}{t+p+n(T+p+r)}\right)$$

where the zero field strength period begins at t=0. The corresponding definite integral of the voltage induced in the receive coil is $$\int_{t_1}^{t_2} V(t)dt = \left[\frac{1}{T}\sum_{n=0}^{\infty}\left(t\ln\left(\frac{t+B}{t+C}\right) + B\ln(B+t) - C\ln(C+t)\right) + \frac{1}{p}\sum_{n=0}^{\infty}\left(t\ln\left(\frac{t+A}{t+C}\right) + B\ln(A+t) - C\ln(C+t)\right)\right]_{t_1}^{t_2}$$

where $A = n(T + p + r)$ $B = T + p + A$ $C = p + A$

The voltage induced in the receive coil from a uniform-conducting half-space due to a magnetic step follows a decay curve which can be modelled as a function of time t as $$V(t) \propto \frac{1}{t^{5/2}}$$

The voltage induced in the receive coil from a uniform-conducting half-space due to the transmit magnetic field waveform follows a decay curve during each zero magnetic field period which can be modelled as a function of time t as $$V(t) \propto \frac{1}{T}\sum_{n=0}^{\infty}(t+T+p+n(T+p+r))^{-\frac{3}{2}} - \frac{1}{T}\sum_{n=0}^{\infty}(t+p+n(T+p+r))^{-\frac{3}{2}} + \frac{1}{p}\sum_{n=0}^{\infty}(t+n(T+p+r))^{-\frac{3}{2}} - \frac{1}{p}\sum_{n=0}^{\infty}(t+p+n(T+p+r))^{-\frac{3}{2}}$$

where the zero field strength period begins at t=0. The corresponding definite integral of the voltage induced in the receive coil is $$\int_{t_1}^{t_2} V(t)dt = \left[\frac{2}{T}\sum_{n=0}^{\infty}\left(-(t+B)^{-\frac{1}{2}} + (t+C)^{-\frac{1}{2}}\right) + \frac{2}{p}\sum_{n=0}^{\infty}\left(-(t+A)^{-\frac{1}{2}} + (t+C)^{-\frac{1}{2}}\right)\right]_{t_1}^{t_2}$$

The voltage induced in the receive coil from a first-order conductive target due the transmit magnetic field waveform follows a decay curve during each zero magnetic field period which can be modelled as a function of time t as $$V(t) \propto \frac{1}{T}\sum_{n=0}^{\infty}\frac{1}{\tau^2}e^{-(t+T+p+n(T+p+r))/\tau} - \frac{1}{T}\sum_{n=0}^{\infty}\frac{1}{\tau^2}e^{-(t+p+n(T+p+r))/\tau} + \frac{1}{p}\sum_{n=0}^{\infty}\frac{1}{\tau^2}e^{-(t+n(T+p+r))/\tau} - \frac{1}{p}\sum_{n=0}^{\infty}\frac{1}{\tau^2}e^{-(t+p+n(T+p+r))/\tau}$$

where the zero field strength period begins at t=0.

Figure 6:
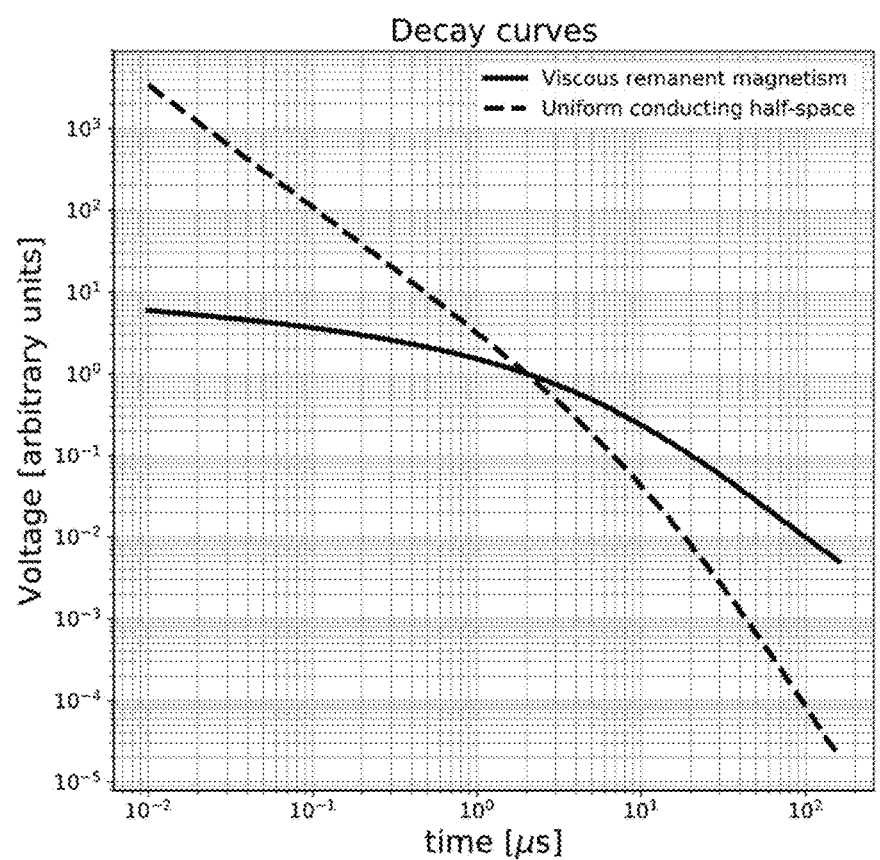
FIG. 6 shows decay curves from soil and a uniform-conducting half-space (such as saline soil or salt)

With T=35us, p=5 us, and r=160 us, the decay curves from soil (viscous remanent magnetism) and a uniform-conducting half-space (such as saline soil or salt) are shown in FIG. 6.

The receive signal is demodulated by integrating the receive signal during three gated windows, with the integrated signal in each of the three gated windows multiplied by a gain factor.

Two such demodulation functions are employed to generate two demodulated signals.

Figure 7:
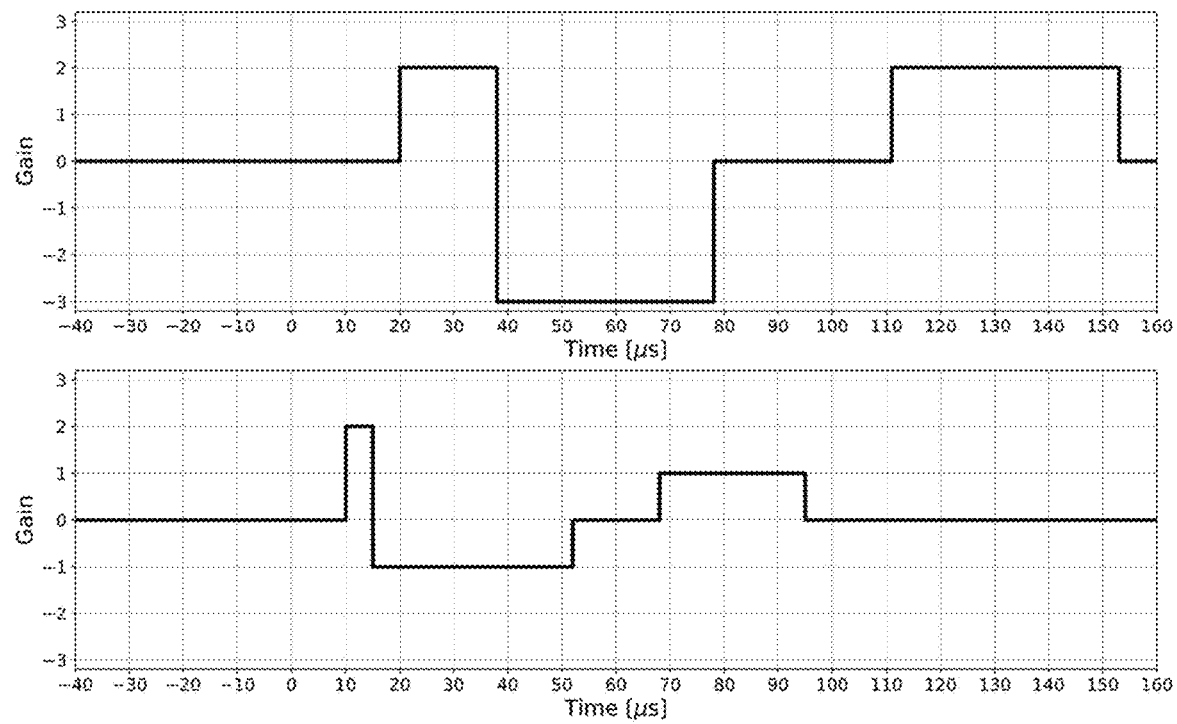
FIG. 7 shows exemplary receive demodulation functions used to process receive signals.

The second demodulation function is defined by three gated windows with associated gain factors:
1. Gain=+2, between t=10 us and t=15 us
2. Gain=−1, between t=15 us and t=52 us
3. Gain=+1, between t=68 us and t=95 us The first demodulation function is defined by three gated windows with associated gain factors:
1. Gain=+2, between t=20 us and t=38 us
2. Gain=−3, between t=38 us and t=78 us
3. Gain=+2, between t=111 us and t=153 us The exemplary receive demodulation functions are shown in FIG. 7. Both of the demodulation functions, top and bottom of FIG. 7, are designed to be insensitive to the response from soil that exhibits viscous remanent magnetism. Both demodulation functions are also insensitive to low-frequency signals that are asynchronous with the transmit magnetic field waveform such as the signal generated by the operator moving the receive coil in a manner which changes the magnetic flux through the receive coil due to the Earth's magnetic field. Note that the first channel begins sampling earlier following the cessation of current in the Transmit winding, so is more sensitive to eddy currents which decay rapidly with time.

If the response of the second demodulation function due to a uniform conducting half-space is defined to be 1, the response of the first demodulation function due to a uniform conducting half-space is 0.486. That is, the second demodulation function is approximately twice as sensitive to a uniform conducting half-space than is the first demodulation function.

Figure 8:
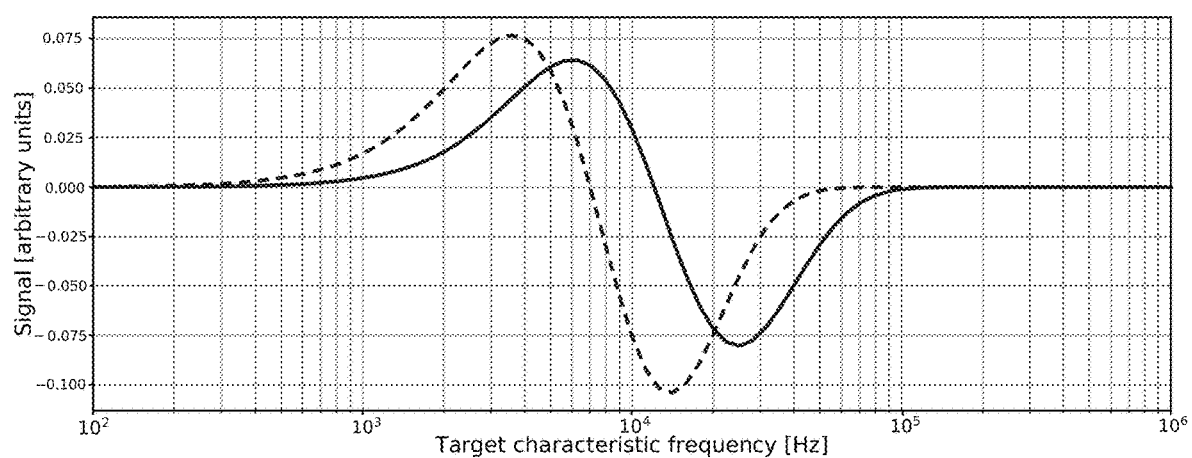
FIG. 8 shows response (signal vs target characteristic frequency) of two demodulation functions to first-order targets of different characteristic frequencies.

The first demodulation function does not sample the receive signal until a very late time after the cessation of the transmit magnetic field, so produces the demodulated signal which is relatively insensitive to the response from a uniform conducting half-space when compared to the demodulated signal produced by the second demodulation function, which samples the receive signal at an early time after the cessation of the transmit magnetic field. The response (signal vs target characteristic frequency) of the two demodulation functions to first-order targets of different characteristic frequencies is shown in FIG. 8. Note that the two demodulation functions are designed to complement each other. The first demodulation function is designed to be sensitive to low-frequency targets (response in dotted line trace), while the second demodulation function is designed to be sensitive to primarily high-frequency targets (response in solid line trace).

A narrow-band (−3 dB @ less than 20 Hz) low-pass filter is applied to each demodulated signal, which removes high-frequency mixing products and reduces the bandwidth of the detector to approximately the range where signals due to the operator moving the search coil near to conductive and magnetic objects are present.

A high-pass filter is applied to each demodulated signal, which removes unwanted drift in the demodulated signals due to thermal effects on the metal detector coil and electronics. The high-pass filter also attenuates the unwanted slowly varying response from the soil produced as the operator moves the search coil over the soil. The high-pass filters applied to the two demodulated signals are different. The high-pass filter applied to the second signal has a higher cut-off frequency (say, −3 dB @ 4 Hz) and is a $2^{nd}$-order filter. The high-pass filter applied to the first signal has a lower cut-off frequency (say, −3 dB @ 0.5 Hz) and is a $1^{st}$-order filter. The first high-pass filter is designed to remove slow drifts in the first signal without significantly attenuating the signals at frequencies associated with the operator moving the coil over targets of interest, which typically lie in the band between 0 Hz and 15 Hz. In contrast, the second high-pass filter, while also removing slow drifts in the second signal, is designed to significantly attenuate signals at low-frequencies. These signals tend to be produced when moving the coil relative to conductive objects which are at a large distance from the coil. These signals are also produced when moving the coil relative to conductive soil as is encountered near salt-water beaches, salt flats, and alkali soils particularly after rain has occurred. The drawback of applying such a filter is the signal from deep-buried targets of interest is also attenuated.

The result is that the first signal is sensitive to deep-buried, and shallow-buried, low-frequency targets, while the second signal is sensitive to shallow-buried, high-frequency targets. Both channels are insensitive to deep-buried, high-frequency targets and the response from moving the coil at typical operating speeds relative to conductive soil.

In another embodiment, there is provided a multi-frequency continuous-wave metal detector which transmits a magnetic field waveform which is the sum of two sine waves at two different frequencies at, say, for example, 10 kHz and 80 kHz. The receive signals is demodulated by direct conversion into two channels using two demodulation functions. The first demodulation function is a sine wave at 10 kHz, producing a first demodulated signal. The second demodulation function is a sine wave at 80 kHz, producing a second demodulated signal. In another form, the waveform is the sum of three sine waves of 15 kHz, 50 kHz, and 65 kHz.

A narrow-band (−3 dB @ less than 20 Hz) low-pass filter is applied to each demodulated signal, which removes high-frequency mixing products and reduces the bandwidth of the detector to approximately the range where signals due to the operator moving the coil are present.

In this form, the first signal and second signal are processed using two different functions to produce two processed signals. The first processed signal is produced as:

First processed signal=First signal−⅛ Second signal

The response from conductive soil is approximately a linearly increasing function of the transceiver frequency. So the response from conductive soil is expected to be 8 times larger in the second signal than in the first signal. The first processed signal is therefore with the response from conductive soil greatly reduced. The second processed signal is produced as:

Second processed signal=Second signal

The second processed signal is therefore sensitive to conductive soil, whereas the first processed signal is not.

Figure 9:
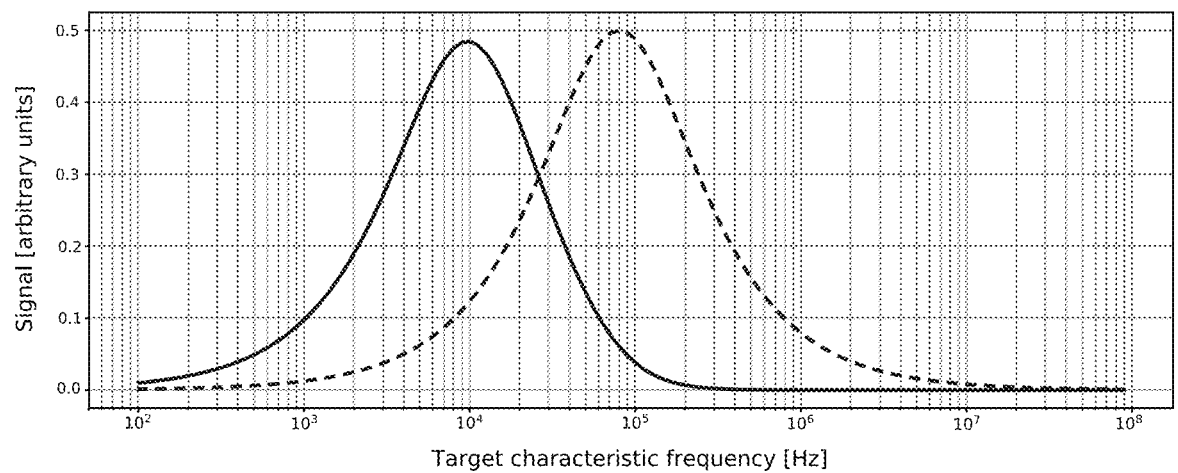
FIG. 9 shows response of the two processed signals to first-order targets of different characteristic frequencies.

The response of the two processed signals to first-order targets of different characteristic frequencies is shown in FIG. 9. In particular, FIG. 9 depicts signal vs target characteristic frequency for the first processed signal (solid line trace) and the second processed signal (dotted line trace). Note that the two demodulation functions are designed to complement each other. The first demodulation function is designed to be sensitive to primarily low-frequency targets, while the second demodulation function is designed to be sensitive to primarily high-frequency targets.

The remaining settings of this embodiment are similar to those of the pulse inductive embodiment described previously. That is, the use of a high-pass filter to attenuate the signal from conductive soils is employed on the second processed signal.

Figure 10:
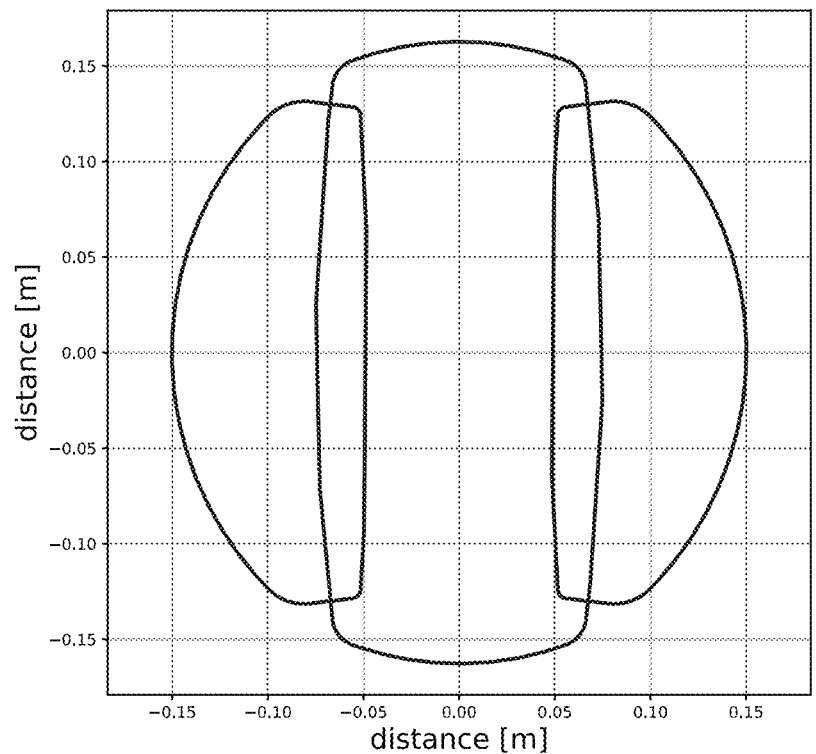
FIG. 10 shows an exemplary transmit-receive coils.

In yet another embodiment, there is provided a multi-frequency continuous-wave metal detector which transmits a magnetic field waveform which is the sum of two sine waves at two different frequencies at, say, for example, 10 kHz and 80 kHz. The coil is a DOD configuration, as shown in FIG. 10. Two separate receive windings (left and right coils) are located such that each has approximately zero magnetic coupling to the transmit winding (centre coil). Two separate receive signals are produced from the two separate receive windings. Both receive windings are such that the signals induced in both receive windings due to a target at a large distance from the coil are equal in magnitude and have the same polarity. A first receive signal is produced as the sum of the signal from the left receive winding and the right receive winding. A second receive signal is produced as the difference of the signal from the left receive winding and the right receive winding. The first receive signal is therefore sensitive to targets at a large distance from the coil, whereas the second receive signal is insensitive to targets at a large distance from the coil.

The first receive signal is also sensitive to conductive soil, which tends to behave like a target at a large distance from the coil, whereas the second receive signal is insensitive to conductive soil.

The first receive signal is demodulated by direct conversion into two channels using two demodulation functions. The first demodulation function is a sine wave at 10 kHz, producing a first demodulated signal. The second demodulation function is a sine wave at 80 kHz, producing a second demodulated signal.

In this form, the first demodulated signal and second demodulated signal are processed using a function to produce a first processed signals. The first processed signal is produced as:

First processed signal=First demodulated signal−⅛ Second demodulated signal

The response from conductive soil is typically a linearly increasing function of the transceiver frequency. So the response from conductive soil is expected to be 8 times larger in the second demodulated signal than in the first demodulated signal. The first processed signal is therefore with the response from conductive soil greatly reduced.

The second receive signal is demodulated by direct conversion into one channel using a third demodulation function. The third demodulation function is a sine wave at 80 kHz, producing a third demodulated signal. This third demodulated signal can be referred to as a second processed signal. The third demodulation function is sensitive to high-frequency targets. Since the second processed signal is produced from the second receive signal, and the second receive signal is insensitive to conductive soil and deep-buried targets, the second processed signal is sensitive to shallow high-frequency targets but not conductive soil and deep-buried targets. The response of the two processed signals to first-order targets of different characteristic frequencies is again shown in FIG. 9. Note that the two demodulation functions are designed to complement each other. The first demodulation function is designed to be sensitive to primarily low-frequency targets, while the second demodulation function is designed to be sensitive to primarily high-frequency targets. A narrow-band (−3 dB @ less than 20 Hz) low-pass filter is applied to each processed signal, which removes high-frequency mixing products and reduces the bandwidth of the detector to approximately the range where modulators due to the operator moving the coil are present.

The remaining settings of this embodiment are similar to those of the pulse inductive embodiment described previously.

Figure 11:
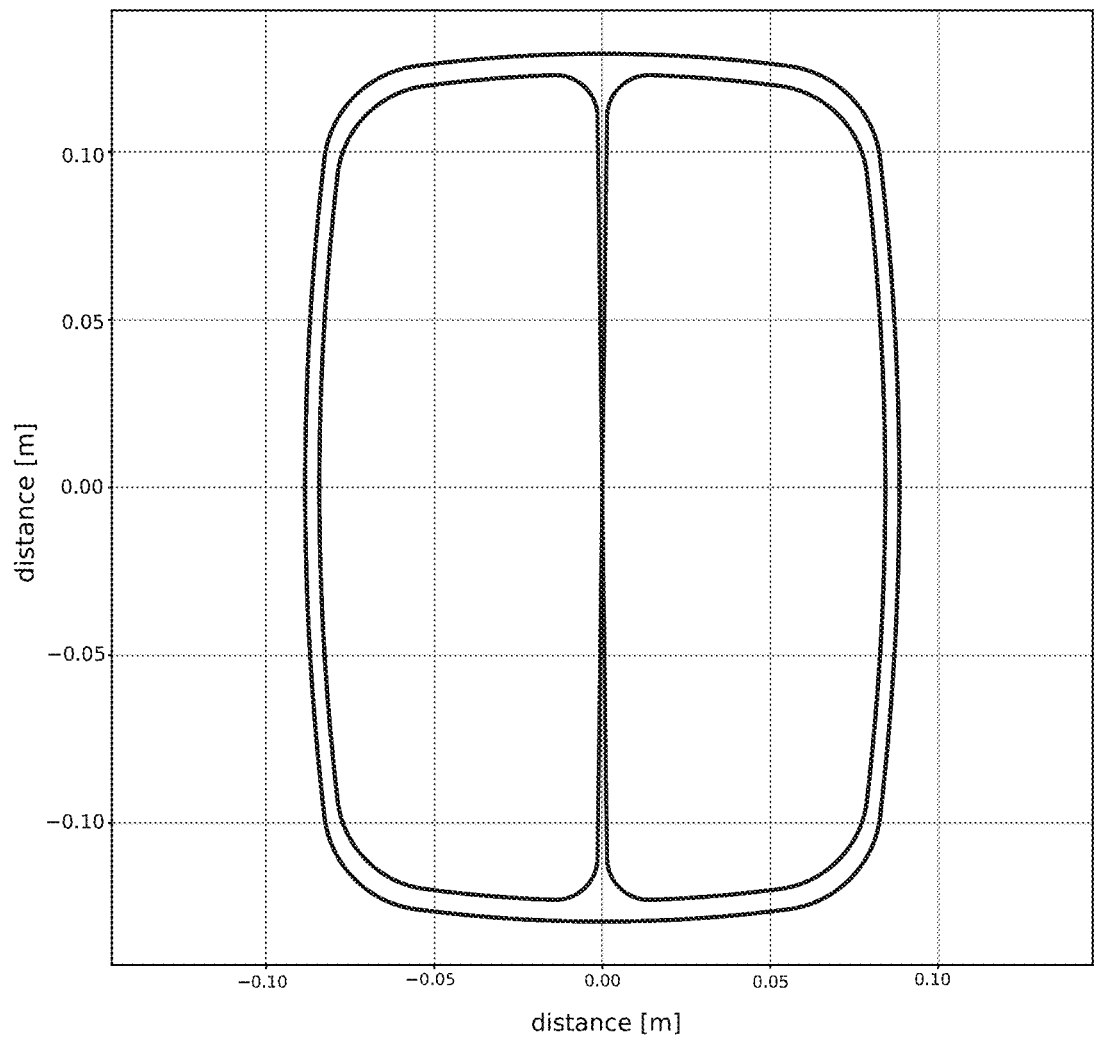
FIG. 11 shows another exemplary transmit-receive coils.

In yet another embodiment, there is provided a hybrid metal detector which transmits as a continuous-wave metal detector during the first half of the transmit period, and as a pulse indication metal detector during the second half of the transmit period. The coil consists of a monoloop winding (outer coil) which is used for transmitting the transmit waveform and is also used as a receive winding during the times when the transmit current is substantially zero, and a figure-8 receive only winding (inner figure-8 coil) as shown in FIG. 11. At least one channel is demodulated from the signal in the monoloop receive winding during the times when the transmit current is substantially zero in a similar manner as in embodiment described with in paragraph 56. This channel may be insensitive to the response from the saline component of the soil, and is insensitive to the response from the log-uniform component of the soil. This channel is sensitive to deep-buried targets of interest by virtue of the monoloop receive coil. At least one channel is demodulated from the signal in the figure-8 receive winding during the second half of the transmit period. This channel may be insensitive to the response from log-uniform component of the soil. The channel is insensitive to the response from the saline component of the soil by virtue of the figure-8 receive coil, however it remains sensitive shallow-buried high-frequency targets of interest.

In other embodiments, it is possible to produce an indicator output which combines the information from both processed signals. It's also possible to produce two independent indicator outputs, one from each processed signal. For example, the two processed signals may be combined with a maximum function to produce an indicator output as Indicator output [at time=$i$]=maximum (first processed signal [at time=$i$],second processed signal[at time=$i$])

As another example, two independent indicator outputs may be produced

Indicator output 1 [at time=$i$]=first processed signal [at time=$i$]

Indicator output 2 [at time=$i$]=second processed signal [at time=$i$]

These two indicator outputs may modulate two independent carrier tones, which may be of different frequencies, and may be summed and presented to the operator as a single audio stream or may be presented to the operator as two independent audio streams.

Those of skill in the art would understand that information and signals may be represented using any of a variety of technologies and techniques. For example, data, instructions, commands, information, signals, bits, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM or any other form of computer readable medium. In the alternative, the computer readable medium may be integral to the processor. The processor and the computer readable medium may reside in an ASIC or related device. The software codes may be stored in a memory unit and executed by a processor. The memory unit may be implemented within the processor or external to the processor, in which case it can be communicatively coupled to the processor via various means as is known in the art.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A method for improving a metal detector, including:
   processing at least one receive signal due to a receive magnetic field using at least two demodulation functions to produce two processed signals, the at least two demodulation functions are configured such that a first demodulation function is less sensitive to saline soils than a second demodulation function to produce a first processed signal; and the second demodulation function is more sensitive to high-frequency targets than the first demodulation function to produce a second processed signal; and
   the second processed signal is with reduced sensitivity to slowly time-varying responses than the first processed signal or with a response that decreases with target depth beneath the coil more rapidly than the first processed signal, or both
   wherein the first processed signal and the second processed signal in combination produce an output signal which is sensitive to deeply buried low-frequency targets, shallow-buried low-frequency targets and shallow-buried high-frequency targets while not being sensitive to saline soil.

2. The method of claim 1, wherein the information is provided within a signal that is with signals due to saline soil substantially rejected therefrom.

3. The method of claim 1, wherein the information is provided within more than one signal, each signal is with signals due to saline soil substantially rejected therefrom, and each signal has one or more characteristics of sensitive to deeply buried low-frequency targets, sensitive to shallow-buried low-frequency targets and sensitive to shallow-buried high-frequency targets.

4. The method of claim 1, wherein the first function is a salt cancelling function.

5. The method of claim 1, wherein the first function is a target frequency-specific discrimination function.

6. The method of claim 4, wherein the second processed signal is based on a receive signal from a quadrupole coil.

7. The method of claim 1, wherein the two functions are further selected such that the first processed signal is more sensitive to anomalies which are extended in time than the second processed signal.

8. The method of claim 4, wherein the second function includes a high-pass filtering with larger attenuation at 0.5 Hz than high-pass filtering included in the first function.

9. The method of claim 1, wherein the step of producing the two processed signals includes the step of attenuating slowly varying signals.

10. The method of claim 9, wherein the step of attenuating slowly varying signals includes an application of a high-pass filter.

11. The method of claim 1, wherein the two processed signals are presented as two indicator signals to a user of the metal detector.

12. The method of claim 1, wherein the two processed signals are combined as a single indicator signals to a user of the metal detector.

13. The method of claim 1, wherein a first receive signal and a second receive signal different form the first signal are processed using the at least two functions to produce two processed signals.

14. The method of claim 13, wherein the first receive signal is from a large receive coil and the second receive signal is from a small receive coil.

15. The method of claim 13, wherein the first receive signal is from a dipole receive coil and the second receive signal is from a quadrupole receive coil.

16. A metal detector, including:
    a transmit coil to transmit a magnetic field;
    a receive coil to receive a receive magnetic field to generate at least one receive signal; and
    a processor for:
      processing at least one receive signal due to a receive magnetic field using at least two demodulation functions to produce two processed signals, the at least two demodulation functions are configured such that a first demodulation function is less sensitive to saline soils than a second demodulation function to produce a first processed signal: and the second demodulation function is more sensitive to high-frequency targets than the first demodulation function to produce a second processed signal; and the second processed signal is with reduced sensitivity to slowly time-varying responses than the first processed signal or with a response that decreases with target depth beneath the coil more rapidly than the first processed signal, or both;

wherein the first processed signal and the second processed signal in combination produce an output signal which is sensitive to deeply buried low-frequency targets, shallow-buried low-frequency targets and shallow-buried high-frequency targets while not being sensitive to saline soil.

17. A non-transitory computer readable medium including instructions to perform the method of claim 1.

* * * * *